(12) United States Patent
Sasmazel et al.

(10) Patent No.: US 6,725,376 B1
(45) Date of Patent: *Apr. 20, 2004

(54) METHOD OF USING AN ELECTRONIC TICKET AND DISTRIBUTED SERVER COMPUTER ARCHITECTURE FOR THE SAME

(75) Inventors: Levent M D Sasmazel, Holmdel, NJ (US); David H. Schneider, Manalapan, NJ (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 262 days.

(21) Appl. No.: 08/969,916

(22) Filed: Nov. 13, 1997

(51) Int. Cl.[7] ................................................ G06F 11/00
(52) U.S. Cl. ........................ 713/201; 713/200; 380/25
(58) Field of Search .......................... 713/202, 200, 713/201; 395/186, 187; 380/25

(56) References Cited

U.S. PATENT DOCUMENTS

| | | | | |
|---|---|---|---|---|
| 5,481,720 A | * | 1/1996 | Loucks et al. | 395/700 |
| 5,535,276 A | * | 7/1996 | Ganesan | 380/25 |
| 5,544,322 A | * | 8/1996 | Cheng et al. | 395/200 |
| 5,560,008 A | * | 9/1996 | Johnson et al. | 395/650 |
| 5,706,427 A | * | 1/1998 | Tabuki | 395/187.01 |
| 5,835,712 A | * | 11/1998 | DuFresne | 709/203 |
| 5,875,296 A | * | 2/1999 | Shi et al. | 713/202 |
| 6,065,117 A | * | 5/2000 | White | 713/159 |
| 6,073,241 A | * | 6/2000 | Rosenberg et al. | 713/201 |

FOREIGN PATENT DOCUMENTS

EP          0 695 985      *  2/1996 ............. G06F/1/00

OTHER PUBLICATIONS

Reichard, K. and E. Johnson. "Securing your X environment." Unix Review. vol. 13, n2, p 73 (4). Feb. 1995.*
Schneier, Bruce. Applied Cryptography, 2nd ed. John Wiley and Sons. pp. 38, 39, 566–571, Oct. 1995.*
(1) B. Schneier, "Applied Cryptography: Protocols, Algorithms, and Source Code in C. ", 1994.

* cited by examiner

Primary Examiner—Norman M. Wright
(74) Attorney, Agent, or Firm—Lowe Hauptman Gilman & Berner, LLP

(57) ABSTRACT

A distributed computer system and server architecture transmitting an electronic ticket over the system, such as the Internet, enabling a user to be authenticated and authorized for a requested operation. An "eticket" architecture (including identification information) is generated by, for example, an authentication server. The information in the eticket is hashed using, for example, a Message Digest Protocol, and a hash number is generated. The hash number is then encrypted by the authentication server using a private key, and the identification information in the eticket and the encrypted hash number are concatenated by the authentication server to generate a completed "eticket" architecture. The "eticket" may then be transmitted over the Internet (i.e., a non-secure environment) from server to server without having the information in the "eticket" altered, and without having to "reauthenticate" the user at each server.

19 Claims, 17 Drawing Sheets

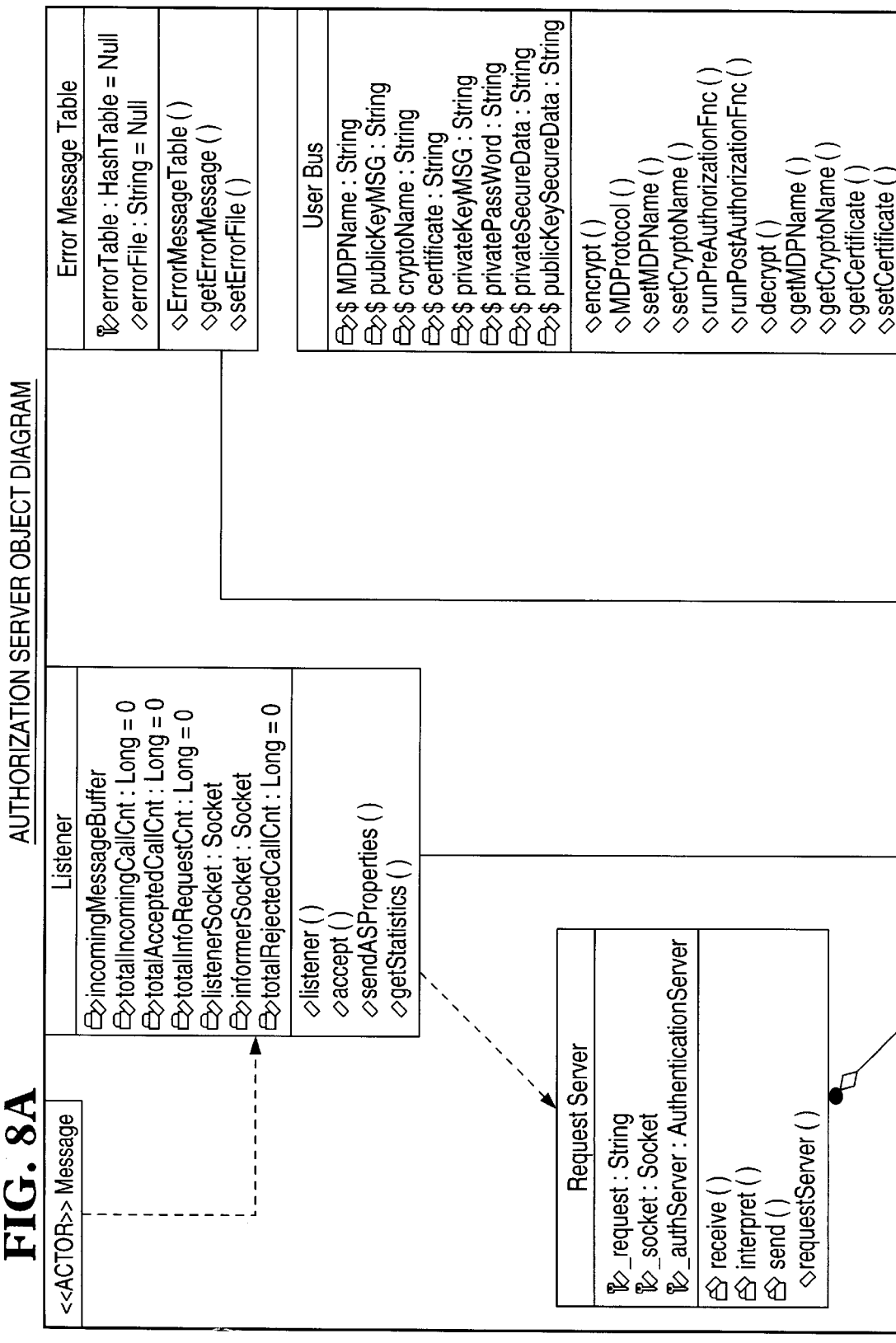
FIG. 8A  AUTHORIZATION SERVER OBJECT DIAGRAM

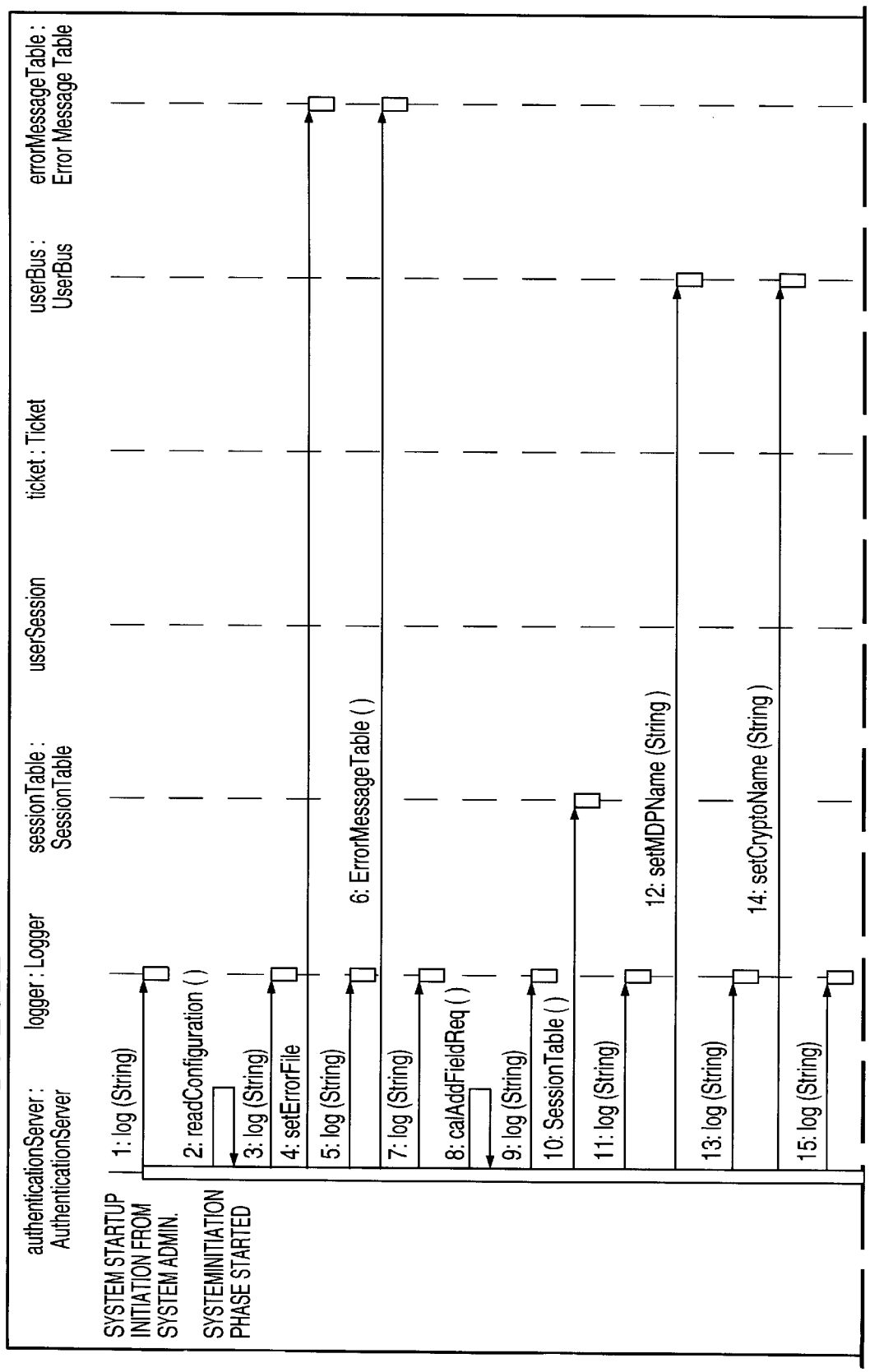

METHOD OF USING AN ELECTRONIC TICKET AND DISTRIBUTED SERVER COMPUTER ARCHITECTURE FOR THE SAME

TECHNICAL FIELD

The present invention relates to user authentication and/or authorization of data communications and, more particularly, to data communication over a distributed computer system and server architecture that securely maintains user authentication and/or authorization throughout the distributed computer system and server architecture.

BACKGROUND ART

Many Internet protocols and applications are designed to serve large public user groups. Because of this, Internet Servers were designed to serve their community in a stateless manner. One request to the server has no relationship to the previous or next request. All requests are independent, rather than considered as part of a user "session" to that server. This approach simplified server activity to service many requests from many users, without having to establish and track sessions for each user. However, the approach introduces a new problem to solve; user privacy and security.

In a network environment, security issues such as communication channel integrity and privacy, user authentication, and user authorization exist. Communication between two end points in a network has to be guarded against outside intervention (i.e., High Voltage noise, Lightning or Human). Security affording protection against this kind of intervention is commonly referred to as communication channel integrity and privacy.

Channel integrity and privacy precautions against "natural" events and are typically handled by communication protocols. Algorithms have been developed over the years to perfect and solve these "natural" events and have been proven effective through many years of usage. However, when introducing a channel integrity and privacy problem, such as Human intervention, the reliability of these algorithms deteriorates. Protocol level controls typically do not encrypt data, enabling human intervenors to change Cyclic Residency Control (CRC) information and any information on an open transmission channel. Hence, any user sensitive data (for example, credit card numbers or other private user information) traveling on the Internet can be obtained by any human intervenor.

In an effort to resolve this problem, Web Technology providers architected Secure Socket Layer (SSL). SSL is the product residing between Web applications and the Communication Protocol Layer. SSL provides data encryption, server authentication and message integrity for TCP/IP connections. This effectively handles protecting the privacy and integrity of data traveling over the Internet.

User authentication is defined as "determining the true identity of a user or an object attempting to access a system." Any non-public system has to have an authentication system in order to filter and identify users from one another. However, Web servers do not typically keep track of the user identity throughout the duration of that users visit to the site. For complete security, the user identity must be provided with each request made of the Web server. This may be accomplished by having the user "log on" for each new request, or by conducting a behind the scenes "re-authentication" of the user for each request. These techniques are, however, inconvenient for the user and/or time consuming for the application.

User authorization involves determining what types of activities are permitted for an authenticated user or object. Authorization is generally grouped into two categories: (1) Data Set Authorization (typically controlled by the application), and (2) Function Set Authorization (typically controlled by the operating system).

Based on the foregoing, we have determined that web user "authentication" must first be accomplished before optionally following with user "authorization". Hence, efficiency may be increased if "authentication" for each "authorization" request is eliminated.

SUMMARY OF THE INVENTION

To overcome the above-identified disadvantages and shortcomings of the prior art, it is a feature and advantage of the present invention to transmit data over a distributed computer system and server architecture, such as the world wide web, in a more secure and efficient manner.

It is another feature and advantage of the present invention to provide user authentication information which is maintained throughout transmission over a distributed computer system and server architecture, such as the world wide web.

It is another feature and advantage of the present invention to provide user authorization information in addition to the authentication information, enabling the user to gain access to system resources provided, for example, over the world wide web.

According to one aspect of the invention, a distributed computer system and server architecture transmit an electronic ticket, used for verifying user authorization information, to provide secure data communications over the distributed computer system and server architecture. At least one storage device stores data, and at least one user computer transmits the user authorization information and a user request to at least one server. The at least one server, connectable to the at least one user computer, generates the electronic ticket based on at least the authorization information. The authorization information is hashed to produce a signature, the signature is encrypted to prevent unauthorized alteration of the authorization information, and the authorization information and the encrypted signature are concatenated.

In one embodiment of the invention, the distributed computer system and architecture further includes at least another server authorizing the user to access system resources upon validating the integrity of the information in the electronic ticket.

In another embodiment of the invention, the at least one server is an authentication server authenticating the user based on authentication information to generate the electronic ticket including the authorization information.

Another aspect of the invention provides a method for using an electronic ticket generated on a distributed computer system and server architecture for verifying user authorization to provide secure data communication over a distributed computer system and server architecture. The method provides a data packet having information based at least on authorization information to at least a first server connectable to the distributed computer system and server architecture, produces a signature from the at least server by hashing at least the authentication information, encrypting at least the signature using the at least first server, concatenating the information in the data packet with the encrypted signature using the at least first server, and transmitting the ticket over the system in a non-secured environment. A user is authorized by at least a second server to access system resources upon validating the integrity of the information in the ticket having been transmitted in the non-secured environment.

In one embodiment of the invention, MD5 protocol is used to hash the information in the data packet.

In another embodiment of the invention, a private key is used to encrypt the signature.

BRIEF DESCRIPTION OF THE DRAWINGS

For a more complete understanding of the present invention and the advantages thereof, reference is now made to the following descriptions taken in conjunction with the accompanying drawings in which like numbers designate like parts, and in which:

FIGS. 8A–8C are a multiple part class object diagram of the authorization server.

FIGS. 10A and 10B are a multiple part interaction diagram notation of the start-up process of the authentication server.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

BEST MODE FOR CARRYING OUT THE INVENTION

A method and apparatus for information discovery and visualization are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
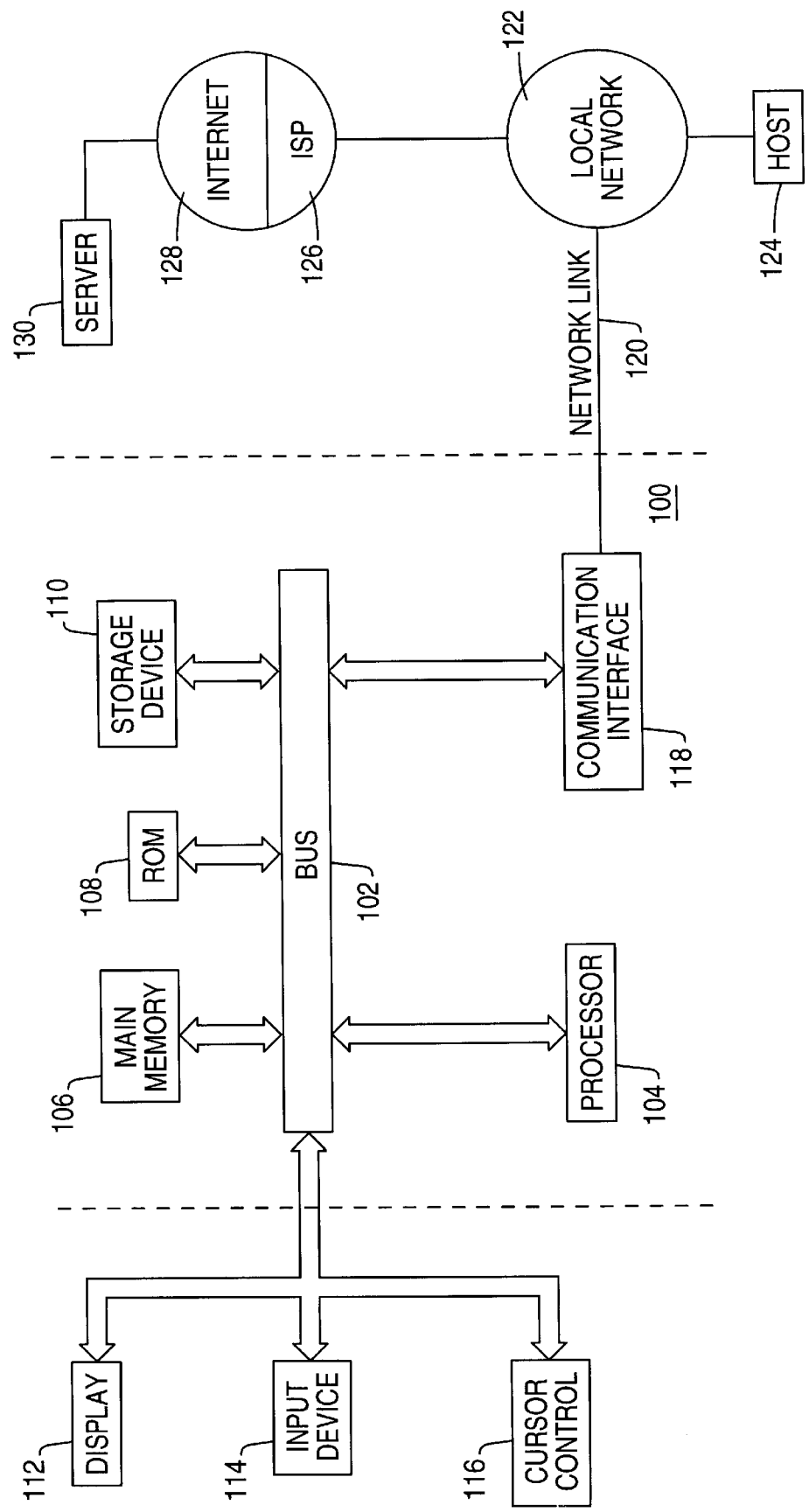
FIG. 1 is a block diagram which illustrates a computer system upon which an embodiment of the invention may be implemented.

FIG. 1 is a block diagram which illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of computer system 100 to discover and visualize information according to a configurable information model. According to one embodiment of the invention, information discovery and visualization is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in main memory 106 causes processor 104 to perform the process steps previously described. In alternative embodiments, hard-wired circuitry may be used in place of or in combination with, software instructions to implement the invention. Thus, embodiments of the invention are not limited to any specific combination of hardware circuitry and software.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

NETWORK OVERVIEW

Figure 2:
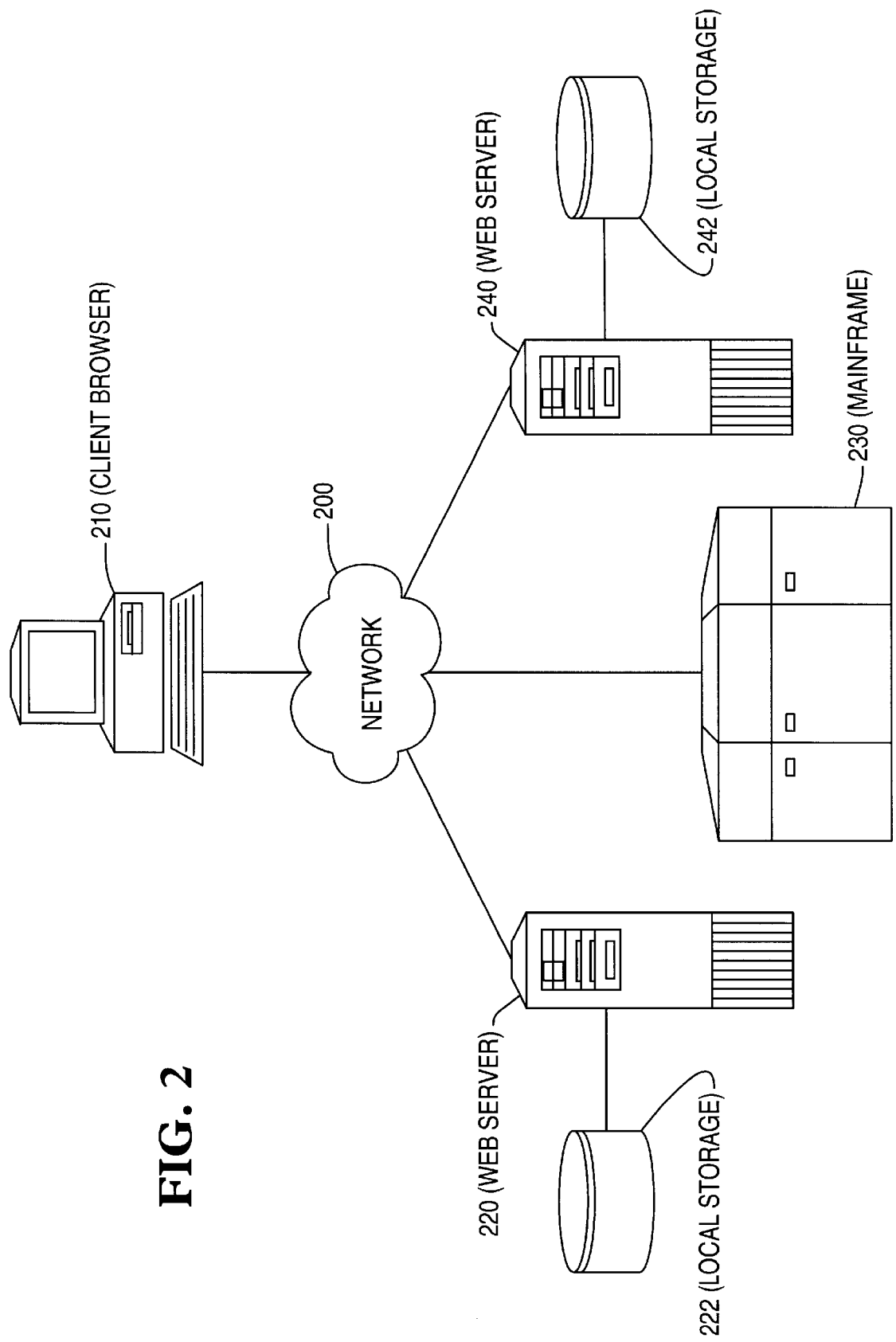
FIG. 2 is a diagram of a network within which the present invention may be implemented.

Referring to FIG. 2, depicted is a network 200 within which the present invention may be implemented. A web server 220 according to one embodiment of the present invention gathers information dynamically from one or more data sources, which may be located at different servers and have incompatible formats, structures the information into an object-oriented, information model, and outputs the information for the user according to an associated visual representation. The information model and the visual representation are defined by human operators according to their own needs, purposes, and preferences as part of the configuration of the server. Multiple information models and visual representations may be defined for any server.

A user may access the web server 220 by executing a web browser at client 210. Web browsers are well-known in the art, and are readily available from such corporations as Netscape Communications Corp. and Microsoft Corp. In order to access the web server 220, the user at client browser 210 activates a hyperlink having a URL (Uniform Resource Locator) of the following form:

TABLE 1 http://www.server.com/query.pl?Class=Seed&View=Paradigm

In the exemplary URL, the network address of the web server 220 is specified as "www.server.com" and the portion of the URL after the question mark (?) hold user specified parameters. The Class and Seed parameters, as explained in more detail hereinafter, indicate an object about which a user intends to discover information. The object is visualized according a paradigm specified by the Paradigm parameter, also explained in more detail hereinafter.

When the hyperlink is activated, the web server 220 receives a request to initiate an information discovery session, specified by parameters embedded in the URL. In response, the web server 220 gathers information from one or more data sources. The data sources can have incompatible formats, e.g. web page, relational database, spreadsheet, text file, etc. The data sources can be stored at a plurality of sites, for example, locally with respect to the web server 220, such as a hard disk at local storage 222, or externally at another site in the network, e.g. at mainframe 230. In fact, the data source can even be another, remote information discovery web server 240.

ELECTRONIC TICKETING ARCHITECTURE

Two server models are used to authenticate a user and maintain that authentication and authorization throughout, for example, a web site visit. The first is the Authentication Server 350, and the second is the function based Authorization Server 360. The Authentication Server 350 receives authentication information from a user and generates an eticket 310 (discussed in more detail below), and the Authorization Server 360 uses the information in the eticket 310 to check authorization functionality. In fact, authorization or access rights of the user are carried as a part of the eticket 310. The two servers need not exist in the same hardware platform, and they are not tightly coupled. Hence, the eticket 310 provides trusted authentication information about the user to the authorization server 360, and the authorization server 360 can perform its authority check functions.

Generally, the eticket 310 is signed with an industry standard public Message Digest signature (MD Protocol), and is protected by a public key encryption system. Hence, anyone who knows the public key may validate the eticket 310 without having to communicate with the Authentication Server 350. This reduces communication between distributed server applications.

Figure 3:
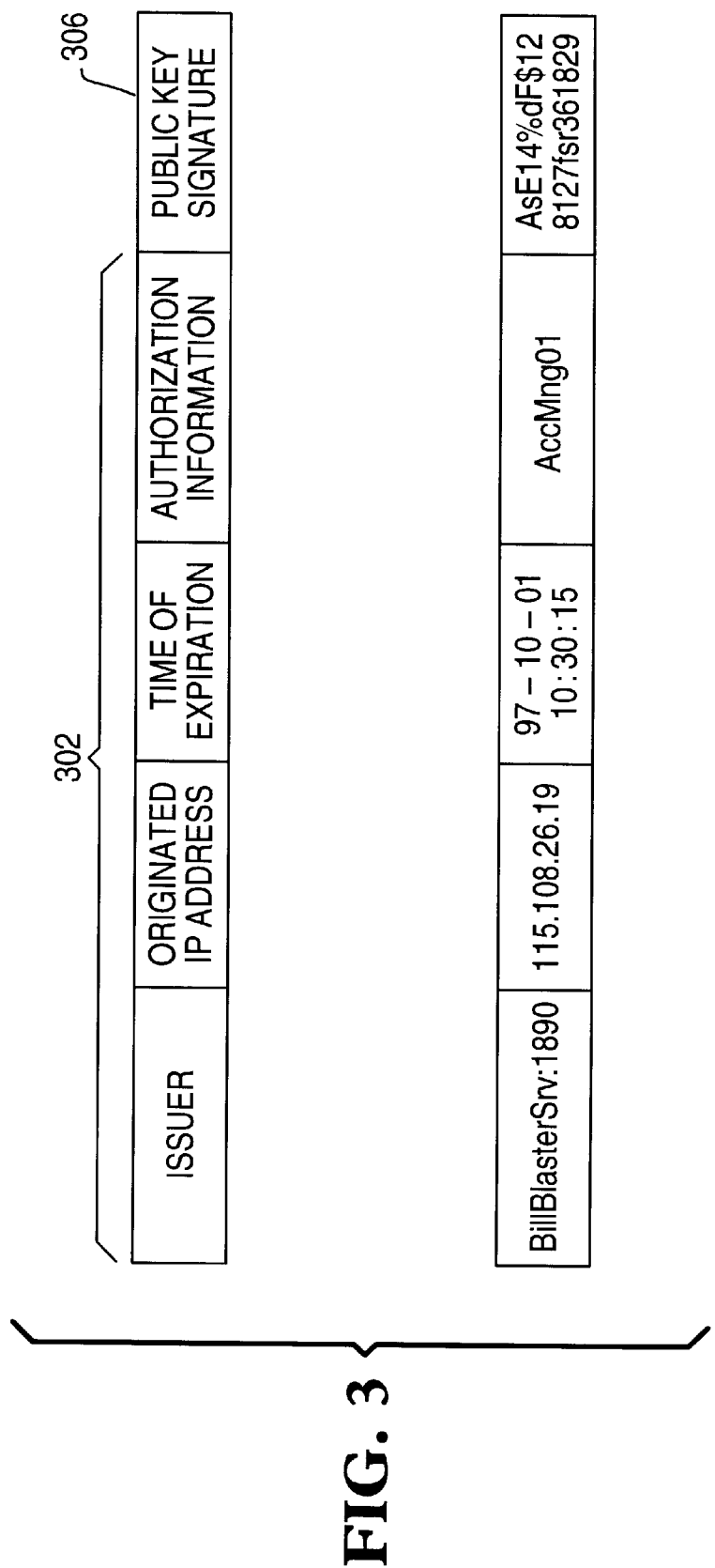
FIG. 3 is an exemplary diagram of a ticket in an embodiment of the present invention.

FIG. 3 is an exemplary diagram of a ticket in an embodiment of the invention. Extendible ticketing architecture "eticket" is based on public encryption algorithms. The eticket 310 has two functional parts. The first part contains the ticket framework 302 and optional user extension 304 (i.e., data packet including optional personal data) and the second part is a "seal" (signature) 306 which protects the eticket 310 content from alterations. Information contained in the eticket 310 are divided by a field separator, for example, a pipe "|" symbol, into separate fields of data.

For example, ticket framework 302 may contain the following information:

(1) Ticket Issuer: Ticket issuer host name (i.e. BillBlasterSrv), (2) Client IP Address: XXX.XXX.XXX.XXX format (i.e. 65.192.217.6), (3) Expiration Date and Time: YY-MM-DD HH:MM:SS (97-10-01 10:30:15), and (4) User Authorization Level: Single String Text (i.e. AccMngO1).

Figure 4:
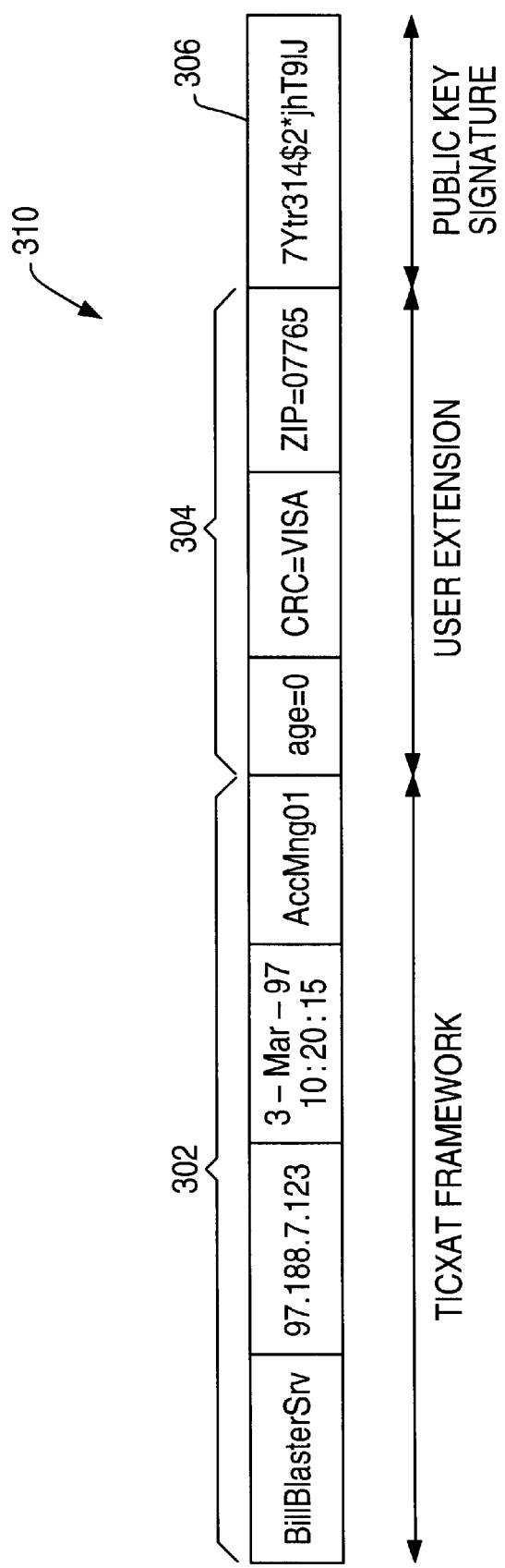
FIG. 4 is an exemplary diagram of an "eticket" in an embodiment of the present invention.

FIG. 4 is an exemplary diagram of an eticket 310 in an embodiment of the present invention. Ticket extension (i.e., optional user extension 304) is accomplished by adding any additional information to the eticket 310. For example, the eticket 310 may contain additional "custom" information, such as user age, credit card number and zip code. When user extension 304 information is inserted into the eticket 310 framework, the data will reside between ticket framework 302 and the Public Key Signature "PKS" 306 fields. Hence, all ticket extension information will automatically be included in the Message Digest Protocol "MDP" and will affect the signature of the eticket 310.

With the eticket 310 architecture, the following security issues in, for example, the world wide WEB environment are addressed:

(1) IP Spoofing, (2) Time controlled session, (3) Ticket alterations, (4) Authorization Levels, and (5) User dependent persistent data storing.

Figure 5:
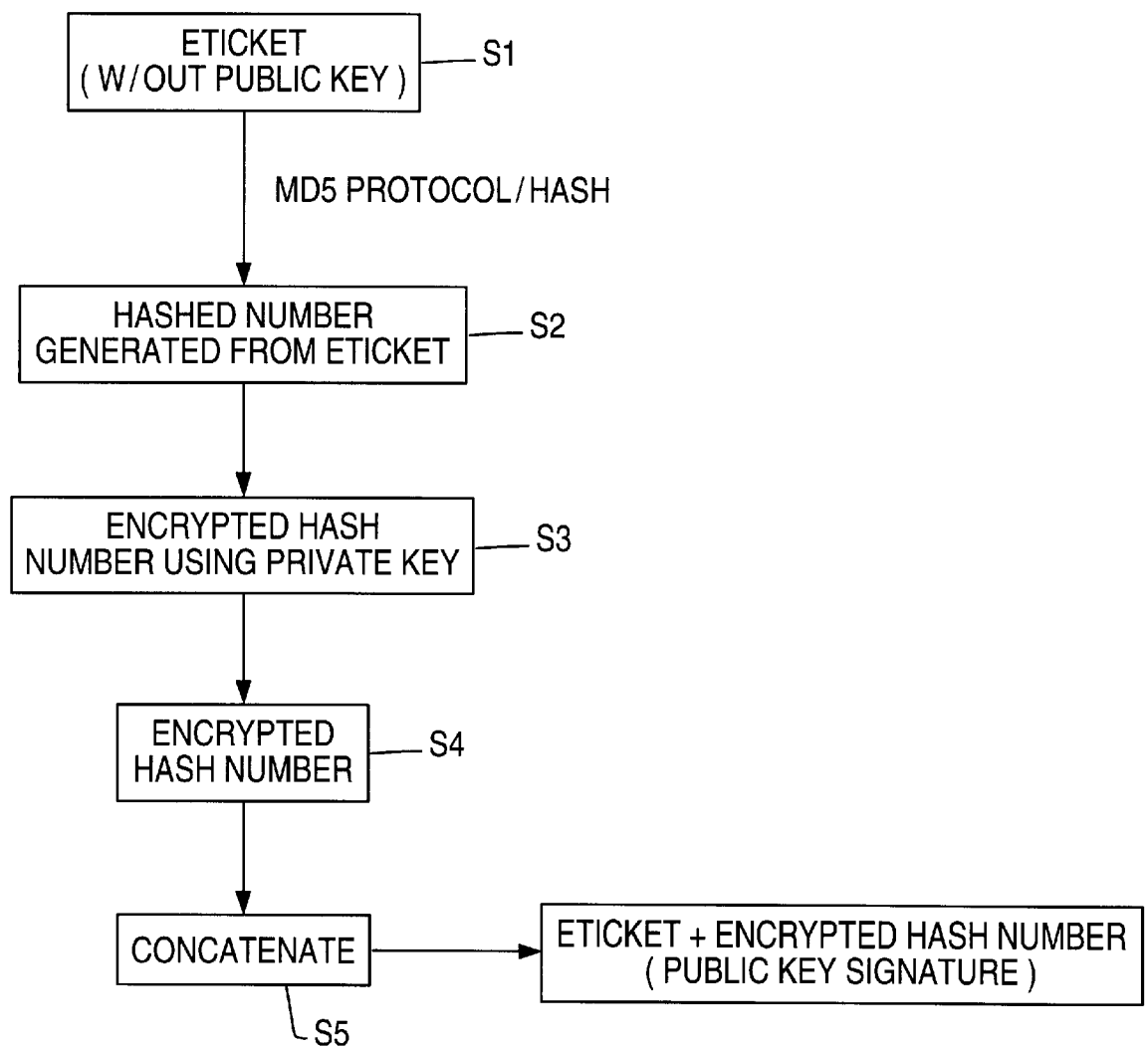
FIG. 5 is a flow diagram of a method of generating an "eticket" in an embodiment of the present invention.

FIG. 5 is a flow diagram of a method of generating an eticket in an embodiment of the present invention. In step S1, the authentication server 350 receives authentication information from a user and generates an eticket 310. At this stage of the process, the eticket 310 (excluding the public key signature field) contains two "fields" of information- (1) the ticket framework 302 and (2) the user extension 304. The ticket framework 302 contains information such as ticket issuer server name, client IP address, expiration date and time, and user authorization, as previously described. The user extension 304 contains information such as user age, credit card number and zip code, also previously described. The information in the eticket 310 (excluding the public key signature field) is then, for example, optionally hashed using, for example, MD5 protocol, and encrypted with a public key encryption system in step S2, generating a hash number in step S3. Of course, other hashing or encryption techniques may also be used. The hash number is representative of the specific information contained in the current eticket 310. The hash number generated in step S3 is then encrypted using a standard private key encryption system in step S4. Encrypting the hash number with a private key encryption system prevents anyone without knowledge of the private key from viewing the hash number. In step S5, the eticket 310 and the encrypted hash number are concatenated to generate the completed "eticket" framework 310. Hence, the completed "eticket" framework 310 includes three "fields" of information- (1) the ticket framework 302, (2) the user extension 304, and (3) the public key signature (encrypted hash number 306).

Figure 6:
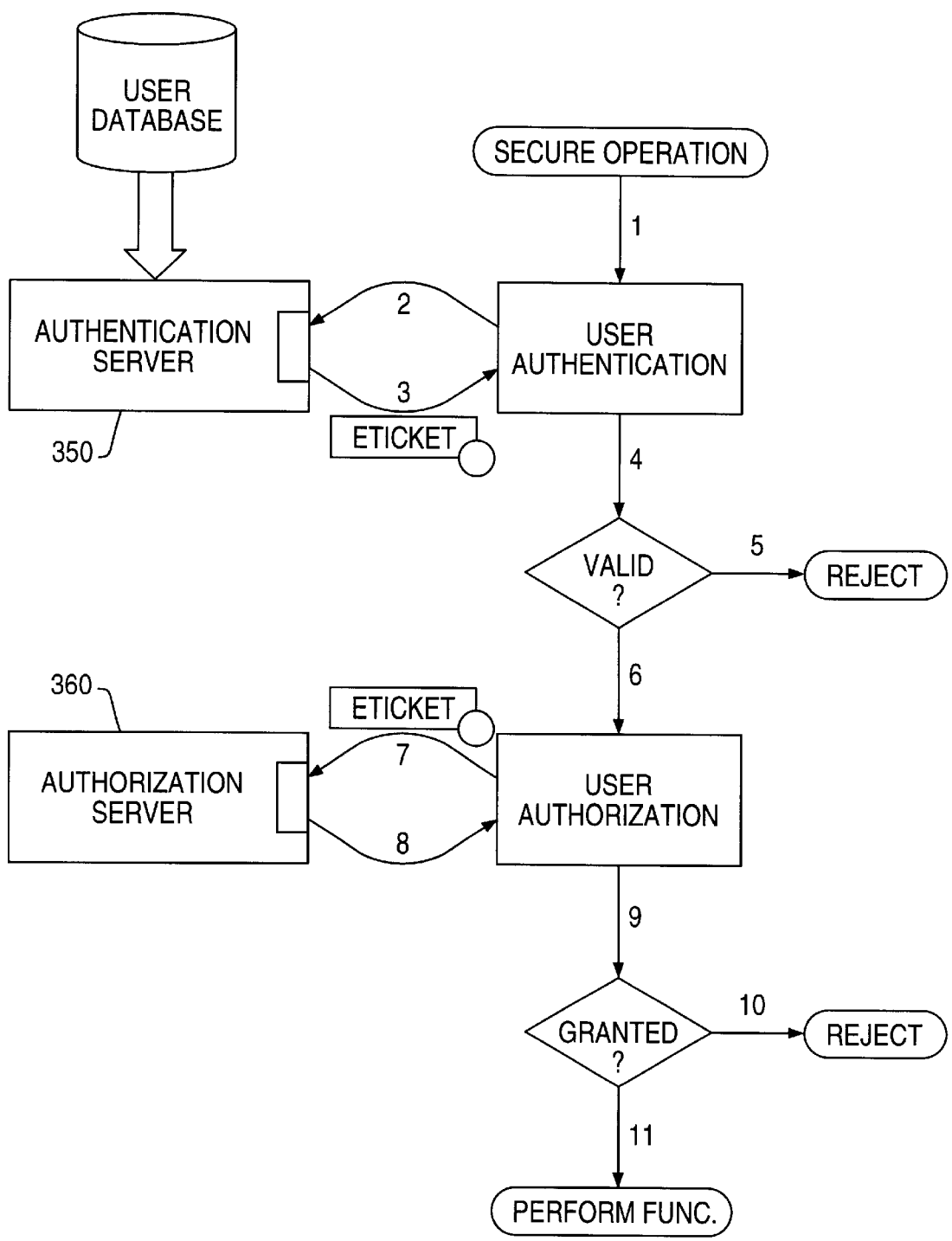
FIG. 6 is a flow diagram of a high level flow authentication and authorization process of the present invention.

FIG. 6 is a flow diagram of a high level authentication process and flow authorization of the present invention. In step 1, a user provides authentication information (such as user ID and password) to, for example, a station terminal, and requests an operation. This "input" step inherently provides a secure operation, as the user is the only one who has access to the authentication information at this stage of the process. The user authentication information is then passed from the station terminal to the authentication server 350 for user validation. The authentication server 350 is the core of the system, and serves to coordinate processes of the system. Hence, the authentication server 350 properties are stored in a server property file, and a ReadConfiguration method will access the property file when the system initiates (see, for example, FIG. 10). The file includes, for example, the following properties:

| | |
|---|---|
| ServerName: | Authentication Server Name |
| IP_Address: | Authentication Server IP Address |
| TicketLifeTime: | Maximum life cycle of one single operation |
| ErrorTextFileName: | Full path of Error Message file |
| LogFileName: | Full path of Authentication Server log file |
| Debug: | System Debug Level 0- None |
| ListenerPortNumber: | Listener Port Number |
| InfoPortNumber: | Information Server Port Number |
| MessageDigestName: | Message Digest Protocol Name (MD-2, MD-5 etc.) |
| CryptoName: | Algorithm used for Message Protection |
| publicKeyMSG: | Public Key for ticket signature |
| privateKeyMSG: | Private Key for ticket signature |
| privateKeyPassWord: | Private Key for password encryption |
| privateKeySecureData: | Private Key for data security requests (Encryption) |
| publicKeySecureData: | Public Key for data security requests (Decryption) |
| certificate: | Server Certificate |

In step 2, the authentication server 350 validates the user authentication information and generates (or issues) an eticket 310 (including ticket framework 302, user extension 304, and public key signature 306), as described above, in step 3. The eticket 310 may then be securely passed from server to server, without the user having to "reauthenticate" each time a new server accesses the information. That is, a user does not have to "re-authenticate" all of the authentication information each time a new server is accessed. Rather, the eticket 310 provides the information (ticket framework 302 and user extension 304) to the server. This information is passed in a secure manner as a result of the public and private key encryption systems (see example below).

The eticket 310 is returned to the client browser 210 when the user requests a service. The request (including the eticket 310) is sent to the web server 220 or 240. In step 4, a web script checks the eticket 310 to determine whether the eticket 310 is authentic or invalid. The information in the eticket 310 must be rehashed. If the authorization server 360 has access to the hashing technique and public key used to encrypt the ticket hash information 304, the authorization server 360 can rehash and decrypt the eticket signature 306. If the hashing technique and public key operate to properly decrypt and rehash the eticket 310, then the information stored in the eticket 310 is determined to be valid. However, it should be noted that the authorization server 360 only has the ability to access the information in the eticket 310, it does not generally have the ability to alter the contact of the eticket 310. Hence, the information in the eticket 310 remains secure. In order for the information in the eticket 310 to be altered, the server must have access to the private key used to encrypt the public key signature 306 (see example below).

Once the eticket 310 has been rehashed and decrypted, the operation request will be returned to the web script in step 8. If the eticket 310 is invalid, an error message is generated, then the user operation request is rejected by the web server 220 or 240 in step 5. If, on the other hand, the eticket 310 is valid, then the user request may continue to be processed by the authorization server 360.

The authorization control process begins in step 6, and the eticket 310 is passed to the authorization server 360 with the requested operation, in step 7. As previously stated, there is no need for the user to "re-authenticate" herself at the authorization server 360 because the eticket 310 includes all of the necessary authentication information. In order for the authorization server 360 to determine whether or not the user is authorized for the specific user authorization level, the information in the eticket 310 is used to determine if the function is authorized for this user (step 9). If the requester is authorized and the request is granted, it is executed in step 11 and the results are returned to the requester. If, on the other hand, the requester is not authorized and the request is denied, the user request is rejected in step 10.

An example of processing the secured eticket 310 follows. Assume that the eticket comprises: (1) a four field ticket framework (fields 1–4), (2) a four field user extension (fields 5–8), and (3) a public key signature (field 9).

eticket

| 1 | 1 | 1 | 1 | 1 | 1 | 1 | 1 | 8 |
|---|---|---|---|---|---|---|---|---|

Field   1   2   3   4   5   6   7   8   9

Referring to FIG. 5, we can step through the "eticket" process. In this example, each of the four fields in the "eticket" framework 302 and user extension 304 include data represented by the number "1" in step S1. The Message Digest/Hash is represented by a summation ($\Sigma$) algorithm (equated to, or exemplary of, the MD5 protocol or other hashing algorithm). Hence, to calculate the Message Digest/Hash, a summation algorithm is implemented using all eight fields of data in step 2. Thus, the summation of all eight fields of data results in the numerical value "8". This "8" represents the Message Digest/Hash. Once the Message Digest/Hash has been generated, it may be encrypted in step S3 using a private key. The encrypted signature is then generated in step S4. In this example, the encrypted public key signature of "8" is represented by "X". In step S5, the encrypted public key signature is concatenated with the ticket framework and user extension information to generate the secure "eticket", as follows.

secure eticket

| 1 | 1 | 1 | 1 | 1 | 1 | 1 | 1 | X |
|---|---|---|---|---|---|---|---|---|

Field   1   2   3   4   5   6   7   8   9

Figure 7:
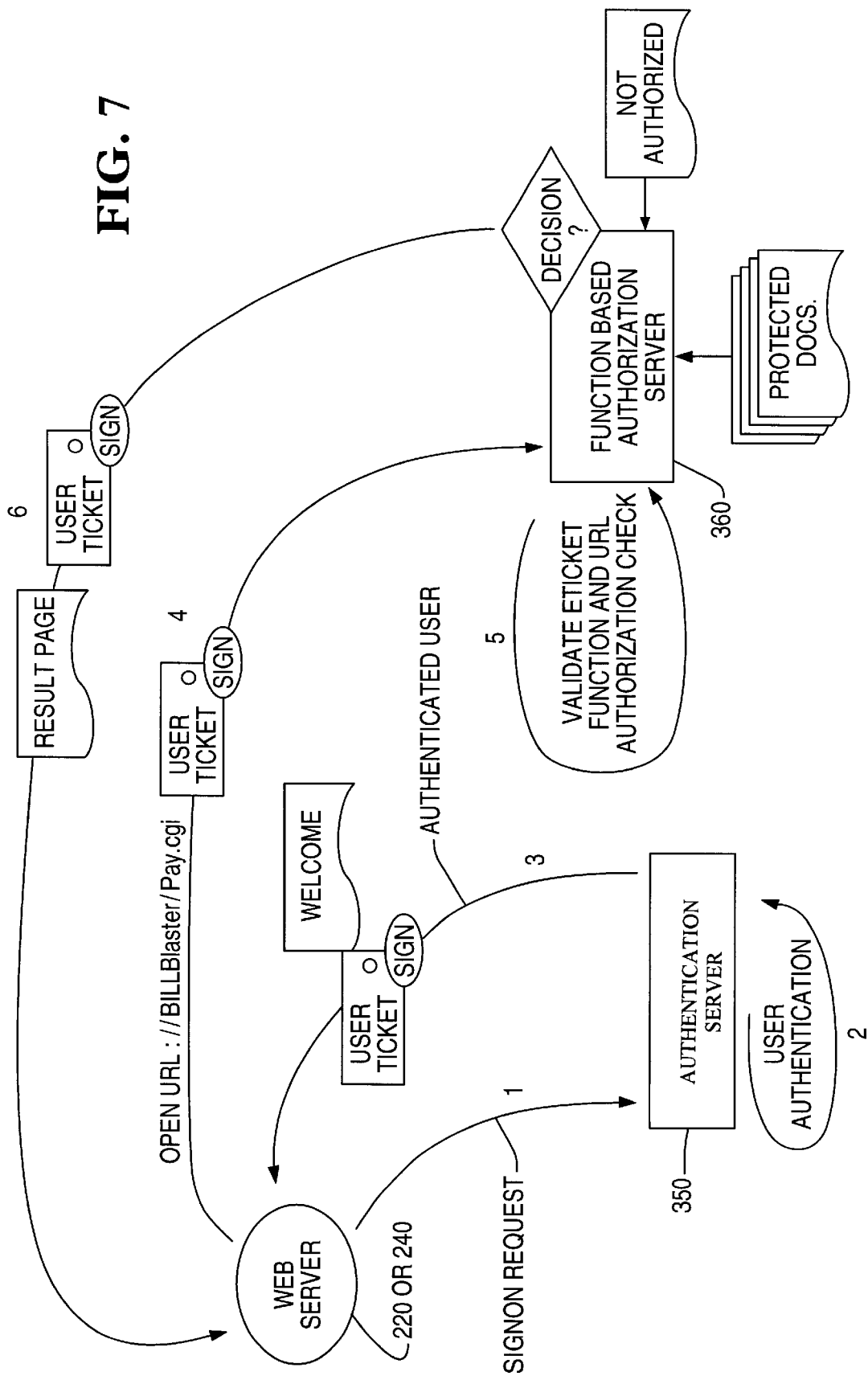
FIG. 7 is a ticket flow diagram of a high level flow authentication and authorization process of the present invention.

FIG. 7 is a ticket flow diagram of a high level flow authorization and authentication process of the present invention. This figure is a simplified version of the diagram illustrated in FIG. 6. A simplified "flow" of the eticket 310 on the system is as follows. A user submits a sign-on request in step 1. The sign-on request is submitted to the authentication server 350, and the user is authenticated in step 2. An eticket 310 is generated by the authentication server 350 using authentication information supplied by the user upon sign-on. The eticket 310 is passed to a web server, for example, 220 or 240, in step 3 the eticket 310 is then returned to the user. When the user requests a function, the request and eticket 310 are sent to the web server 220 or 240, and the server sends the requested eticket 310 in step 4 to function based authorization server 360. An authentication and authorization check is performed in step 5, and a determination is made as to whether or not the user is authorized to perform the requested function. If the user is not authorized, then the request made by the user is denied. If, on the other hand, it is determined that the user is authorized, then the request made by the user, for example a request for protected documents, will be validated and returned in step 6 to the web server 220 or 240.

Figure 8B:
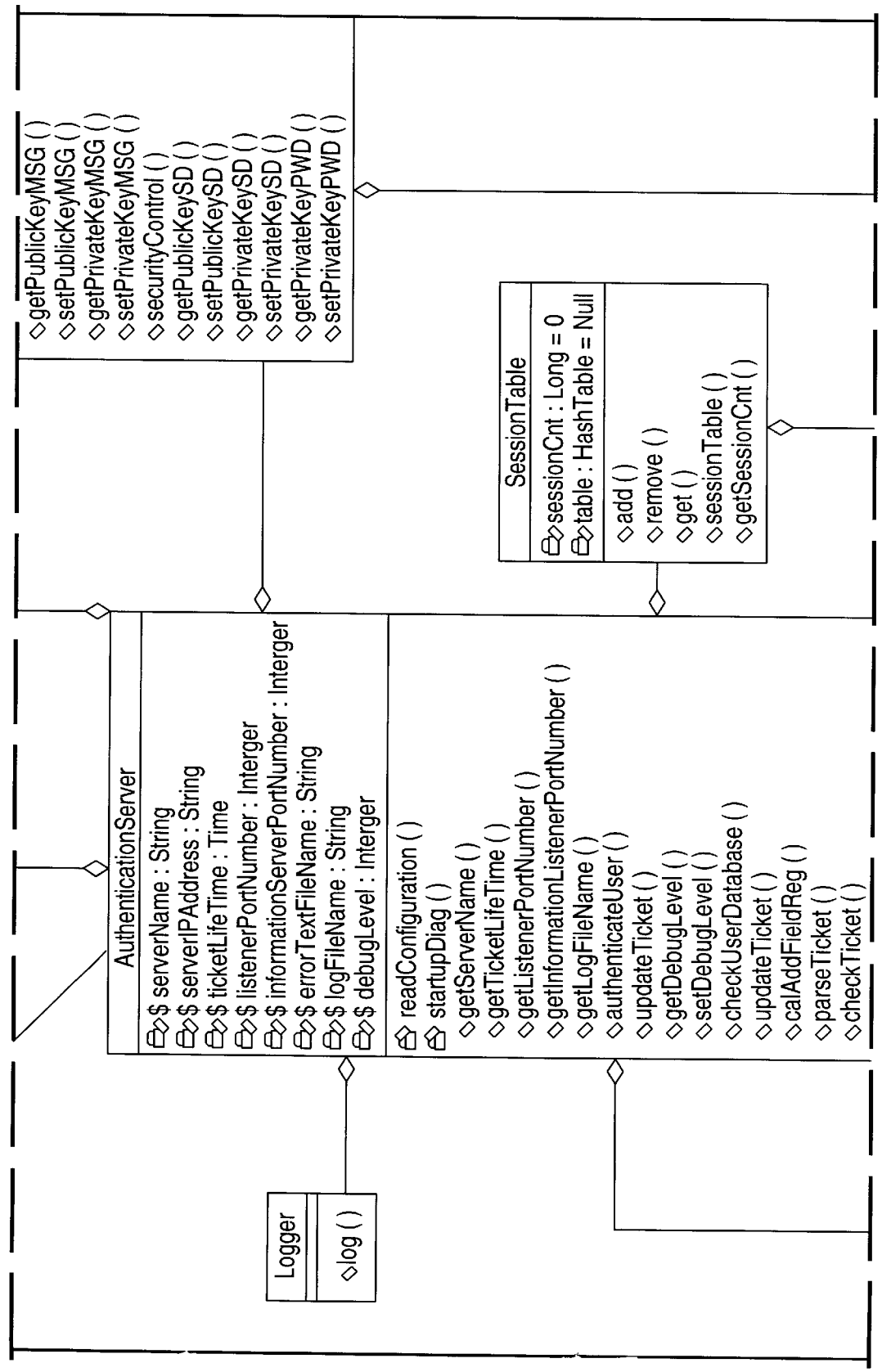
Figure 8C:
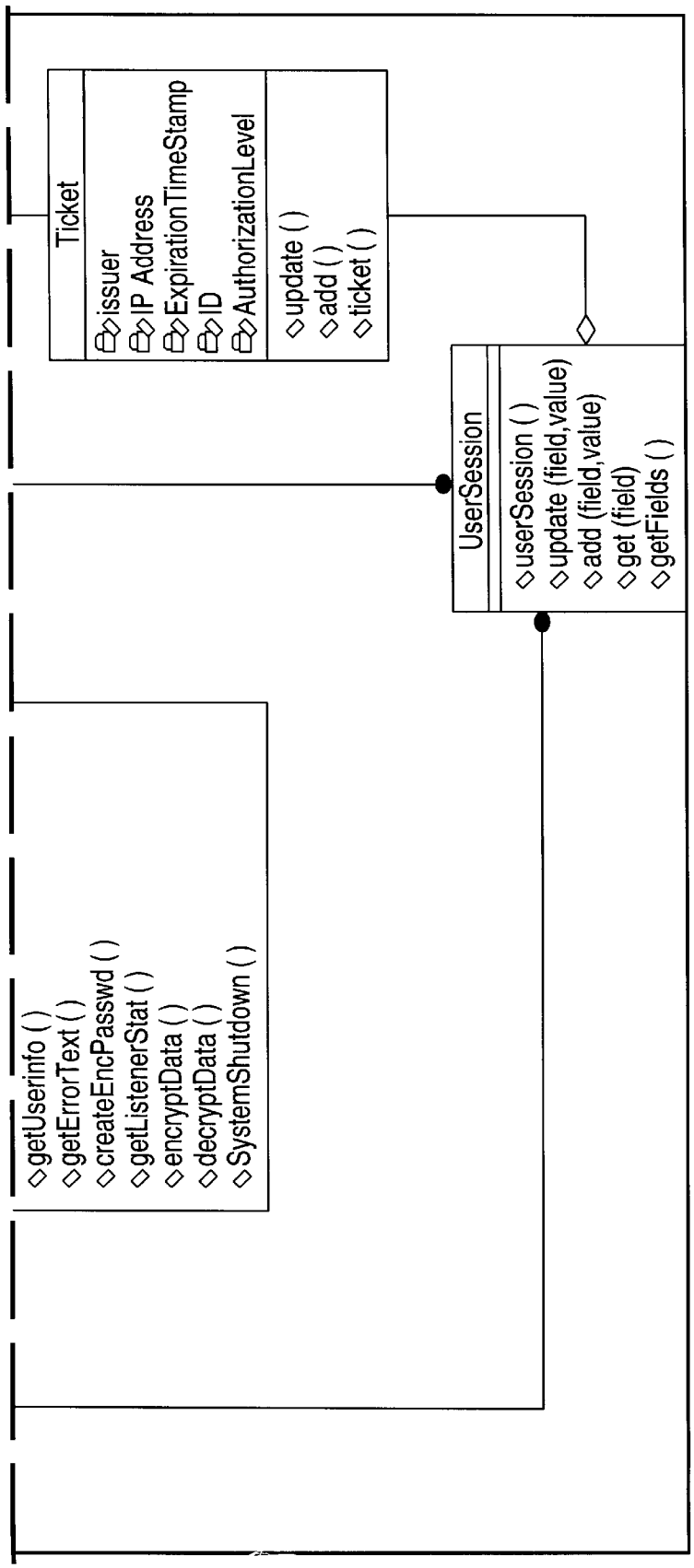
Figure 9:
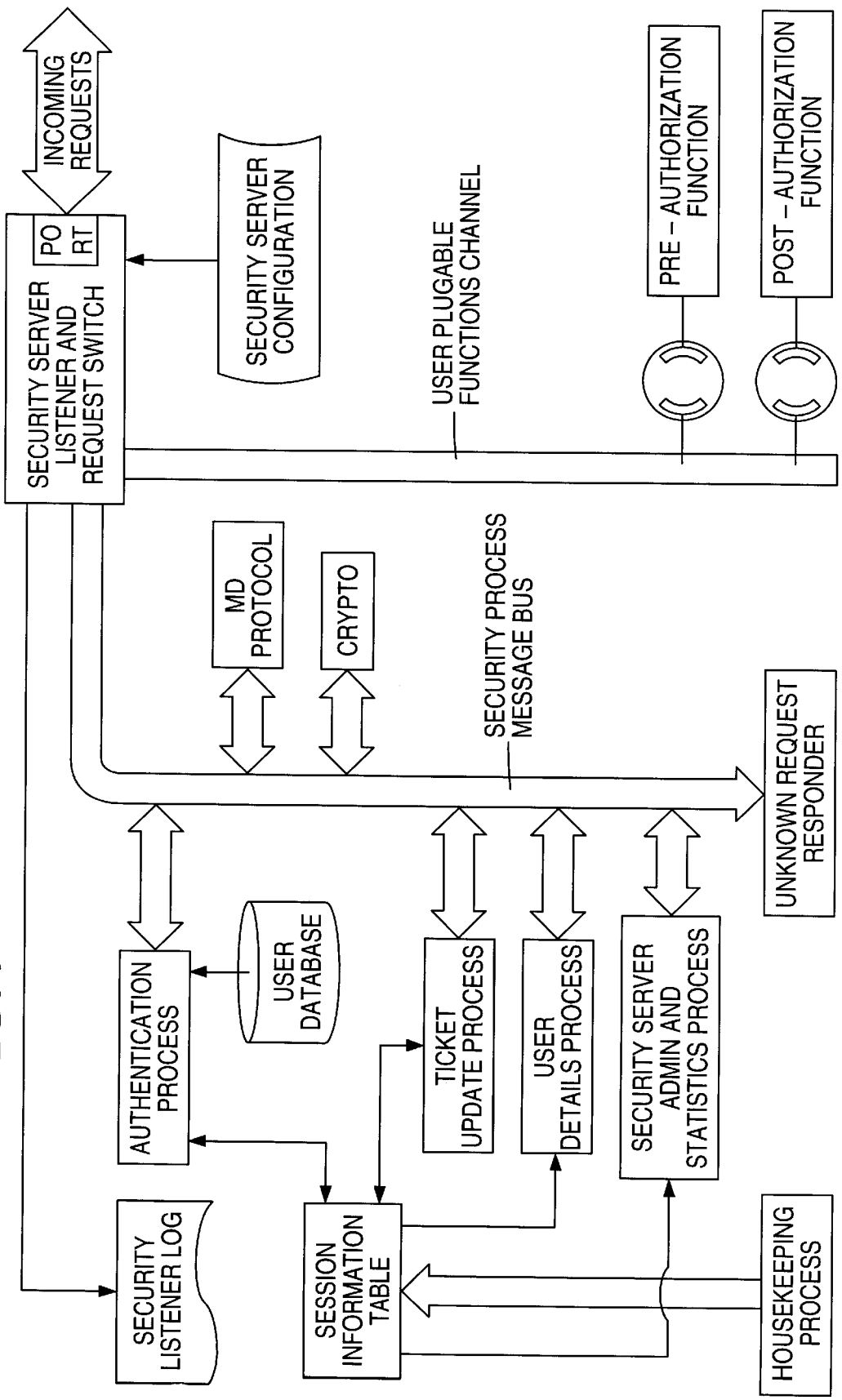
FIG. 9 is a diagram of a high level architecture of the authentication server.
Figure 10B:
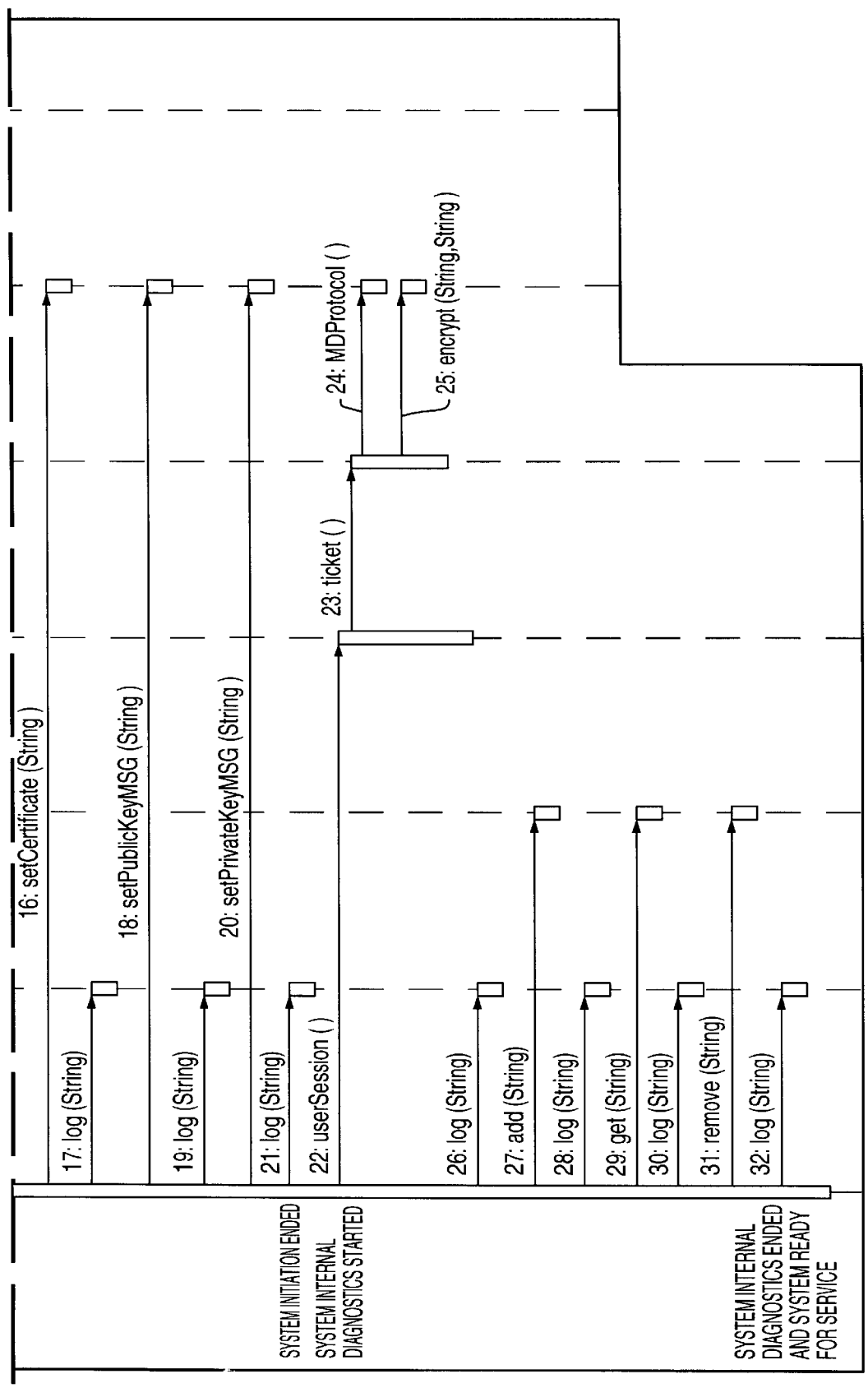
Figure 11:
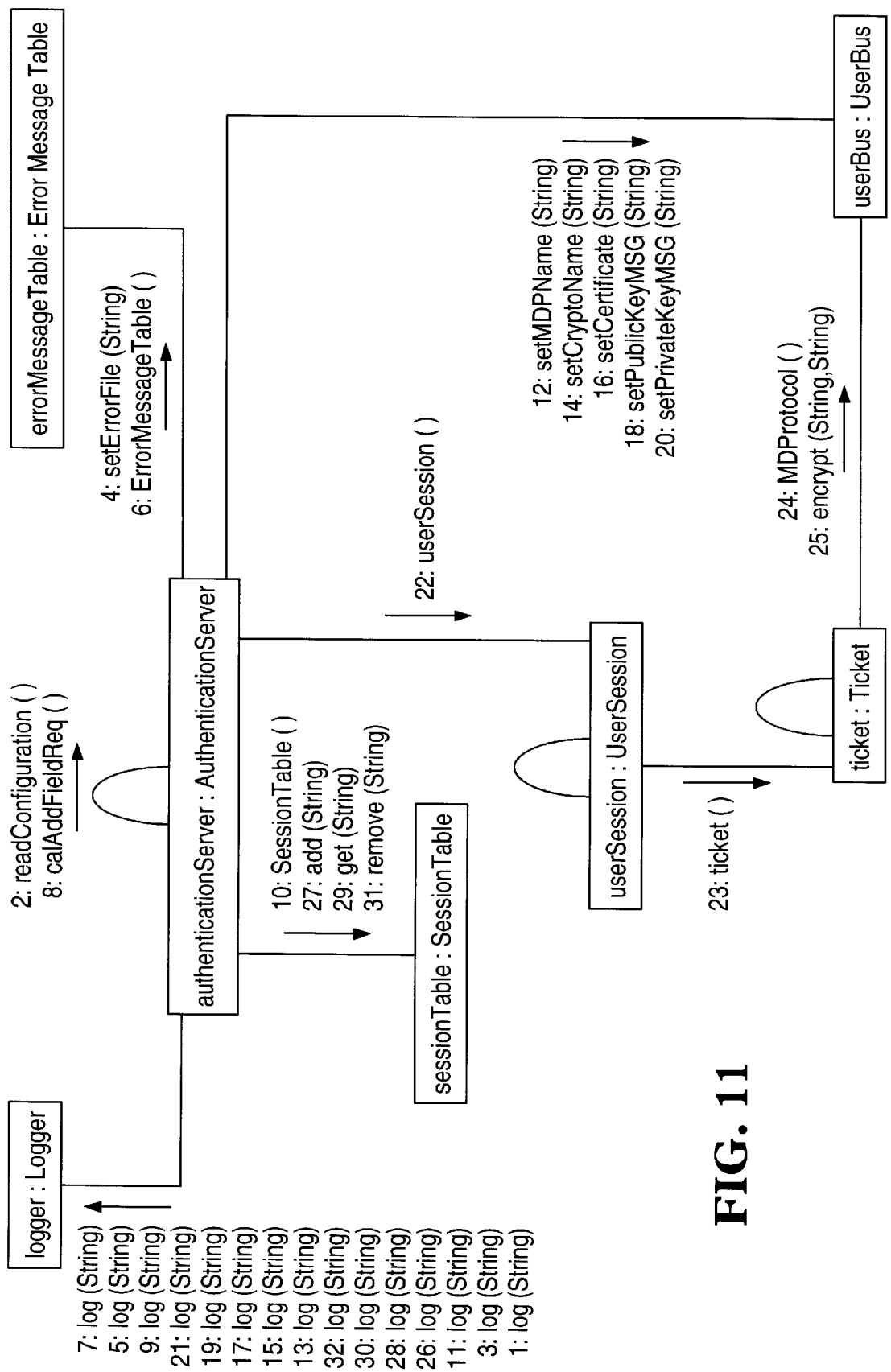
FIG. 11 is an object message diagram representing the start-up process of the authentication server.
Figure 12A:
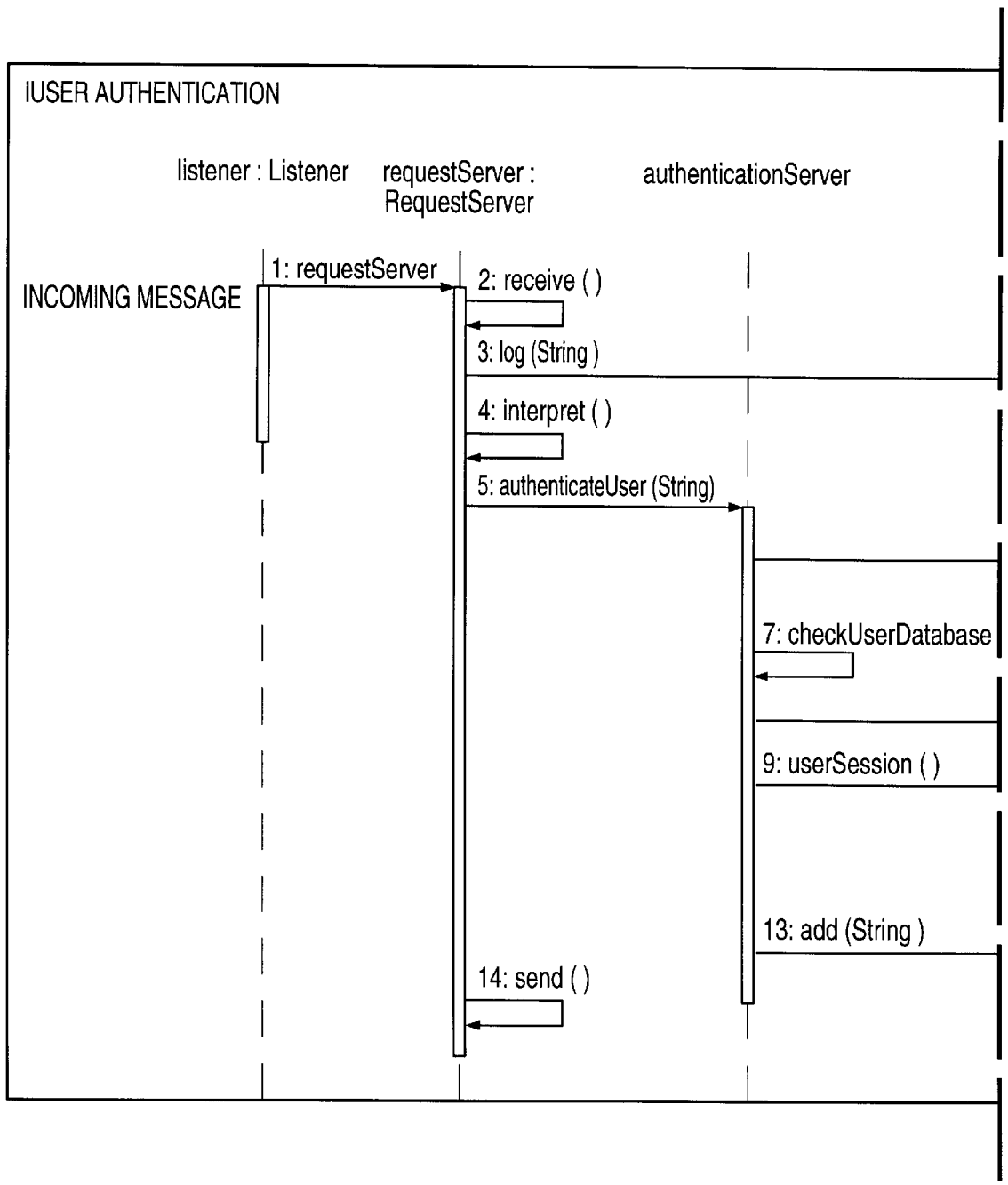
FIGS. 12A and 12B are a multiple part interaction diagram notation of a user authentication attempt.
Figure 12B:
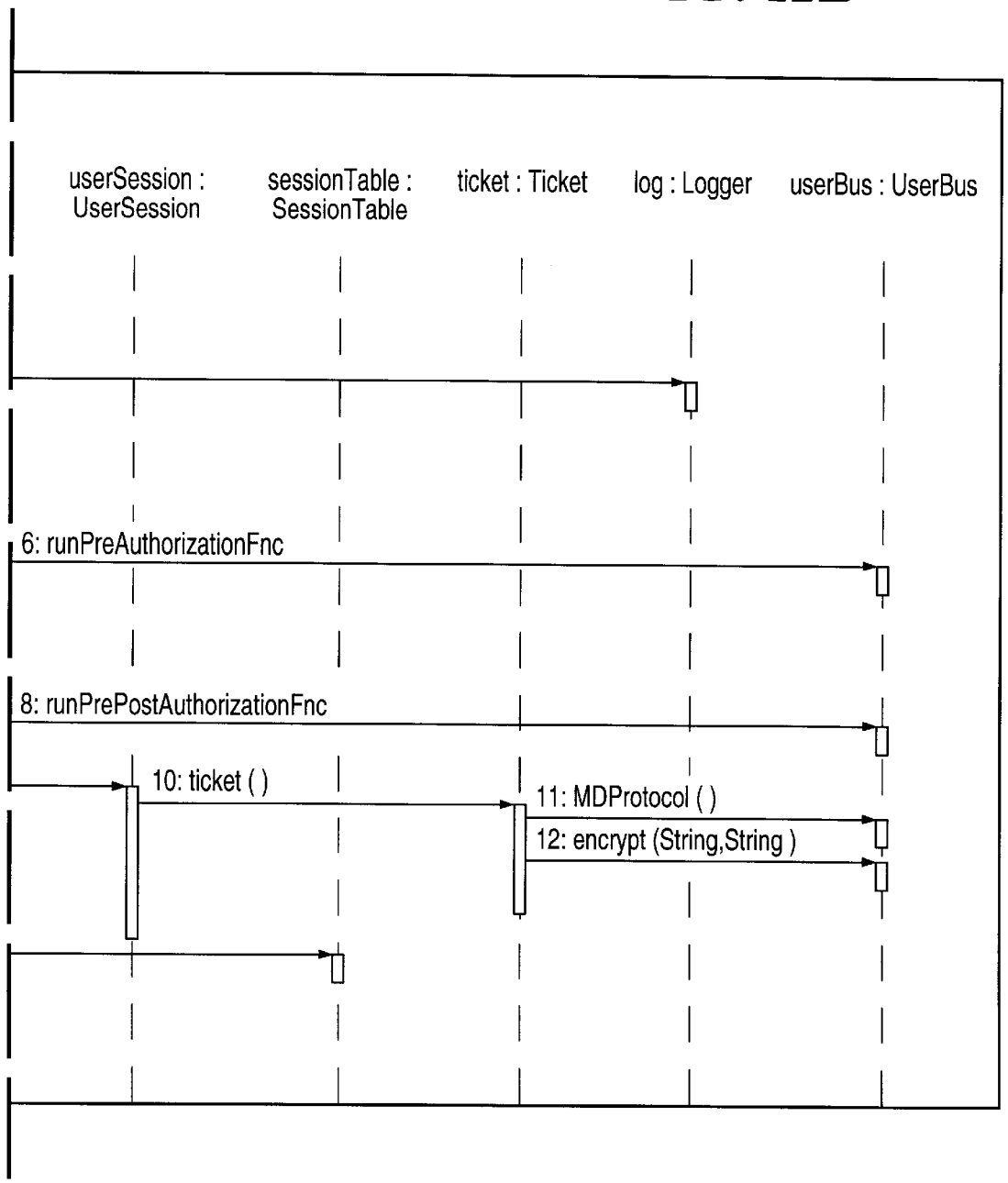
Figure 13:
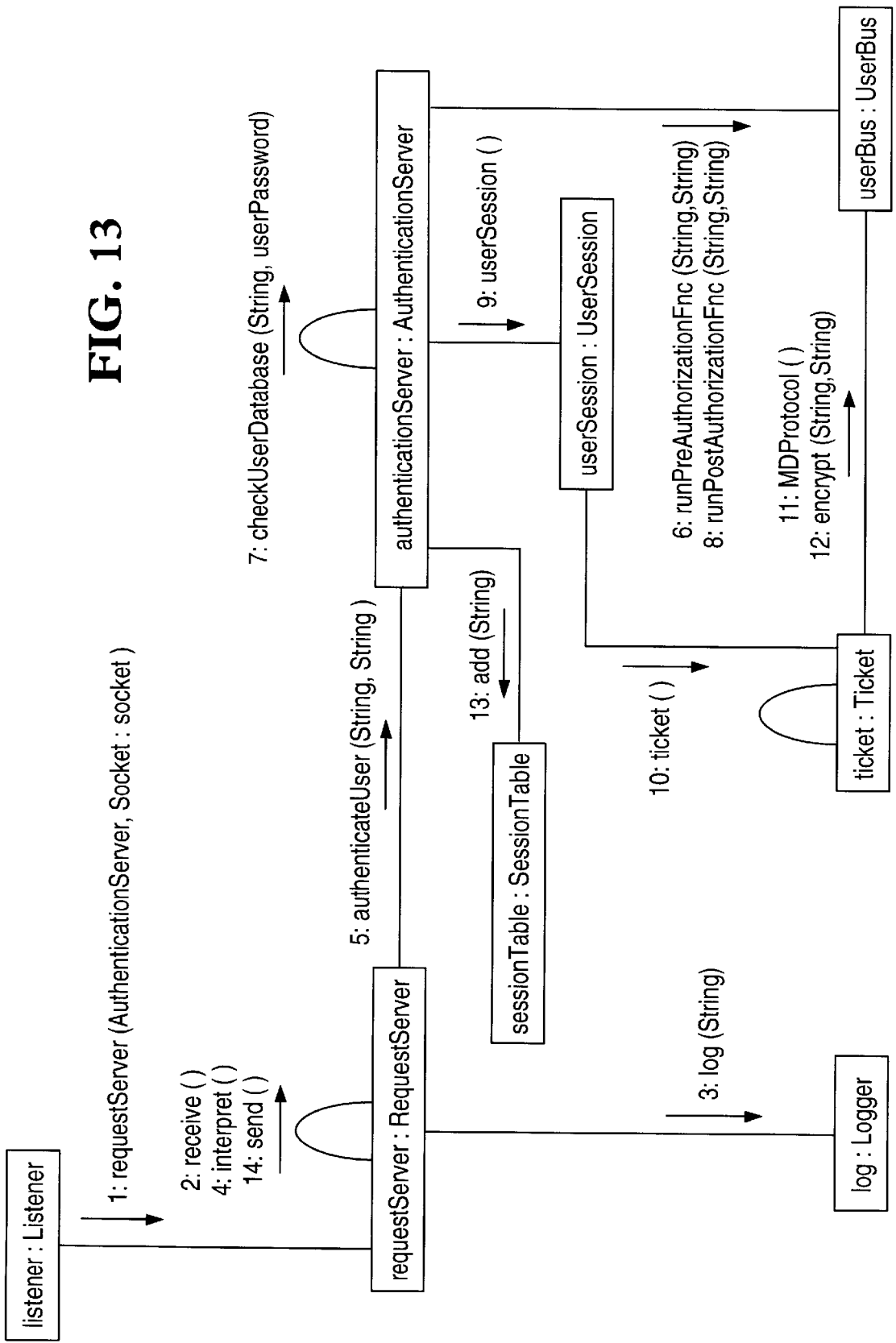
FIG. 13 is an object message diagram representing a user authentication attempt.

FIGS. 8A–8C are a multiple part class object diagram of the authorization server. FIG. 9 is a diagram of a high level architecture of the authentication server. FIGS. 10A and 10B are a multiple part interaction diagram notation of the start-up process of the authentication server. FIG. 11 is an object message diagram representing the start-up process of the authentication server. FIGS. 12A and 12B are a multiple part interaction diagram notation of a user authentication attempt. FIG. 13 is an object message diagram representing a user authentication attempt.

This invention will provide a much more confined user and a world wide WEB based application system by providing a user session concept with the "eticket" architecture. This ticketing architecture will tie the user browser 210 to the Internet Server 240 (or application). It uses all industry standard security components like public key encryption or message/text unique signature system (also known as message digest protocols). Hence, it becomes nearly impossible to alter any information in the "eticket". At the same time it is very easy to validate and honor the ticket for authorization purposes even in a distributed server application.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A distributed computer system and server architecture for transmitting an electronic ticket used for verifying user authorization and authentication to provide a session and a state environment over the distributed computer system and server architecture, comprising:

at least one storage device storing data;

at least one user computer transmitting the user authorization and authentication information and a user request, wherein the authentication information includes the IP address of the user; and at least one server, connected to the at least one storage device and the at least one user computer, that generates the electronic ticket based on at least the authorization and authentication information, wherein the authorization and authentication information is hashed to produce a signature, the signature is encrypted to prevent unauthorized alteration of the authorization and authentication information, and the authorization and authentication information and the encrypted signature are concatenated.

2. The distributed computer system and server architecture according to claim 1, further comprising at least another server authorizing the user to access system resources upon validating the integrity of the information in the electronic ticket.

3. The distributed computer system and server architecture according to claim 1, wherein the at least one server is an authentication server authenticating the user based on authentication information to generate the electronic ticket including the authorization information.

4. A method for using an electronic ticket generated on a distributed computer system and server architecture for verifying user authorization and authentication to provide a session and a state environment, comprising the steps of:

providing a data packet having information based on at least authorization and authentication information to at least a first server connectable to the distributed computer system and server architecture, wherein the authentication information includes the IP address of the user;

producing a signature from the at least first server by hashing at least the authorization and authentication information and at least the IP address of the user;

encrypting at least the signature using the at least first server to prevent unauthorized alteration of the information in the data packet;

concatenating the information in the data packet using the at least first server with the encrypted signature to produce the electronic ticket; and transmitting the electronic ticket over the computer system in a non-secured environment.

5. The method for using an electronic ticket according to claim 4, further comprising the steps of:

authenticating a user based on authentication information supplied by the at least first server to generate the electronic ticket including the authorization information; and authorizing the user using at least a second server, connectable to the distributed computer system and server architecture, to access system resources upon validating the integrity of the information in the electronic ticket transmitted in the non-secured environment.

6. The method of using an electronic ticket according to claim 5, further comprising the steps of:

rehashing the information in the electronic ticket using at least a third server, connectable to the distributed computer system and server architecture; and decrypting the information in the electronic ticket using the at least third server and a public key.

7. The method of using an electronic ticket according to claim 4, wherein the encrypting step uses a private key to encrypt the signature.

8. The method of using an electronic ticket according to claim 4, wherein the signature is a hash number generated by hashing at least the authorization information.

9. The method of using an electronic ticket according to claim 4, wherein the producing step uses MD5 protocol to hash the authorization information.

10. The method of using an electronic ticket according to claim 4, wherein the at least first server is a web server.

11. The method of using an electronic ticket according to claim 5, wherein the at least second server is a web server.

12. The method of using an electronic ticket according to claim 6, wherein the at least third server is a web server.

13. A distributed computer system and server architecture for transmitting an electronic ticket used for verifying user authorization and authentication on a transaction by transaction basis to provide a session and a state environment over the distributed computer system and server architecture, comprising:

at least one storage device storing data;

at least one user computer transmitting the user authorization and authentication information and a user transaction, wherein the authentication information includes the user IP address; and at least one server, connectable to the at least one storage device and the at least one user computer, generating the electronic ticket based on at least the authorization and authentication information and transmitting the electronic ticket to the user, wherein the electronic ticket is transmitted at or about the same time as the user transaction to provide the session and the state environment.

14. A method for using an electronic ticket for verifying user authorization to provide a session and a state environment on a transaction by transaction basis, comprising the steps of:

generating the electronic ticket based on at least the user authorization and authentication information, wherein the authentication information includes the IP address of the user;

transmitting the electronic ticket at or about the same time as a user transaction; and verifying the user authorization and authentication to provide the session and the state environment for each user transaction.

15. A method for using an electronic ticket generated on a distributed computer system and server architecture for verifying user authorization and authentication to provide a session and a state environment on a transaction by transaction basis, comprising the steps of:

generating the electronic ticket, via at least one server, based on at least the user authorization and authentication information wherein the authentication information includes the IP address of the user;

transmitting the electronic ticket at or about the same time as a user transaction; and verifying the user authorization and authentication to provide the session and state environment for each user transaction.

16. A distributed computer system and server architecture for transmitting an electronic ticket used for verifying user authorization and authentication to provide a session and a state environment over the distributed computer system and server architecture, comprising:

at least one storage device storing data;

at least one user computer transmitting the user authorization and authentication information and a user request; and at least one server, connected to the at least one storage device and the at least one user computer, that generates the electronic ticket based on at least the authorization and authentication information, the authorization and authentication information is hashed to produce a signature, only the signature is encrypted to prevent unauthorized alteration of the unencrypted authorization and authentication information, and the unencrypted authorization and authentication information and the encrypted signature are concatenated.

17. A method for using an electronic ticket generated on a distributed computer system and server architecture for verifying user authorization and authentication to provide a session and a state environment, comprising the steps of:

providing a data packet having information based on at least authorization and authentication information to at least a first server connectable to the distributed computer system and server architecture;

producing a signature from the at least first server by hashing at least the authorization and authentication information;

encrypting only the signature using the at least first server to prevent unauthorized alteration of the unencrypted information in the data packet;

concatenating the unencrypted information in the data packet using the at least first server with the encrypted signature to produce the electronic ticket; and transmitting the electronic ticket over the computer system in a non-secured environment.

18. A distributed computer system and server architecture for transmitting an electronic ticket used for verifying user authorization and authentication on a transaction by transaction basis to provide a session and a state environment over the distributed computer system and server architecture, comprising:

at least one storage device storing data;

at least one user computer transmitting the user authorization and authentication information and a user transaction; and at least one server, connectable to the at least one storage device and the at least one user computer, generating the electronic ticket based on at least the authorization and authentication information and transmitting the electronic ticket to the user, wherein the electronic ticket is transmitted with each user transaction to provide the session and the state environment.

19. A method for using an electronic ticket for verifying user authorization to provide a session and a state environment on a transaction by transaction basis, comprising the steps of:

generating the electronic ticket based on at least the user authorization and authentication information;

transmitting the electronic ticket with each user transaction; and verifying the user authorization and authentication to provide the session and the state environment for each user transaction.

* * * * *